R. W. CORNELISON.
RECORDING INSTRUMENT.
APPLICATION FILED SEPT. 23, 1920.
1,433,985.
Patented Oct. 31, 1922.
3 SHEETS—SHEET 1.
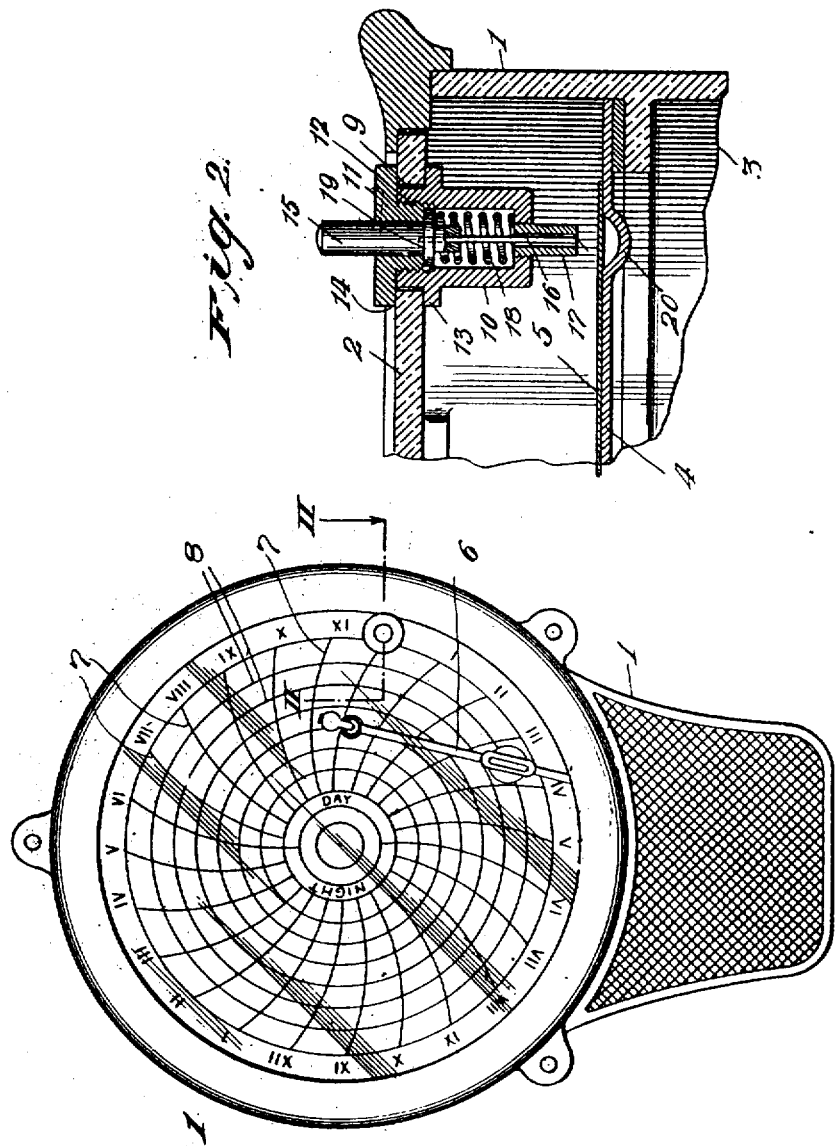
Robert W. Cornelison, INVENTOR
BY Moses Hammond & Middleton
ATTORNEYS

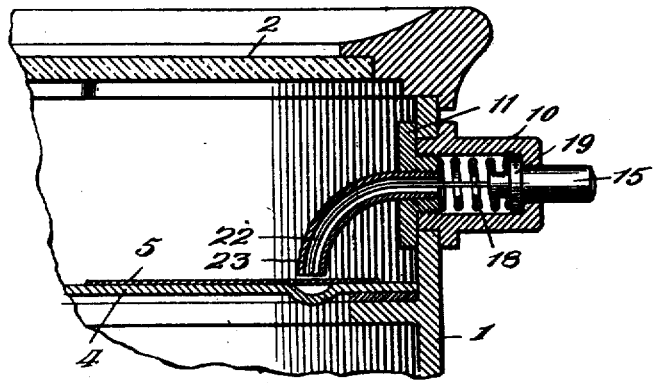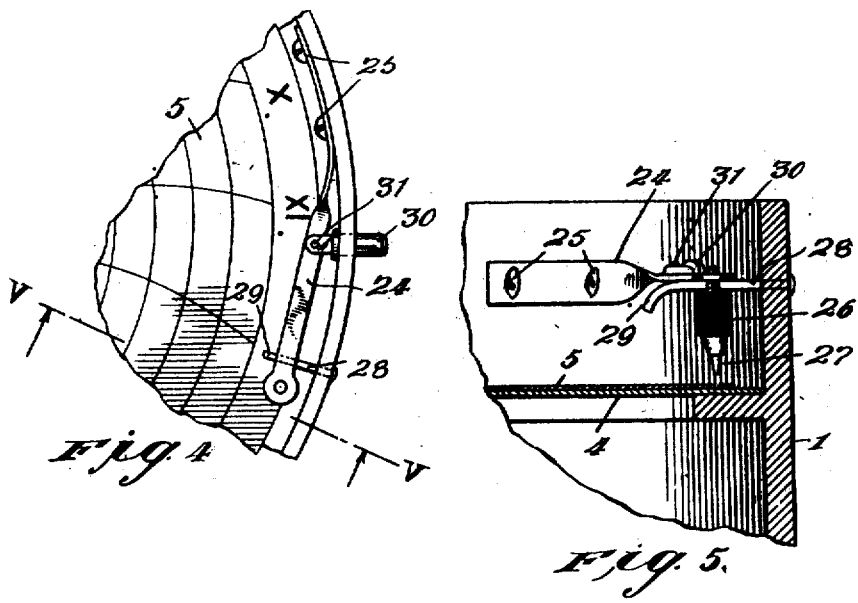

Patented Oct. 31, 1922.

1,433,985

UNITED STATES PATENT OFFICE.

ROBERT W. CORNELISON, OF SOMERVILLE, NEW JERSEY, ASSIGNOR TO SCHAEFFER & BUDENBERG MFG. CO., OF BROOKLYN, NEW YORK, A CORPORATION OF NEW YORK.

RECORDING INSTRUMENT.

Application filed September 23, 1920. Serial No. 412,137.

*To all whom it may concern:*

Be it known that I, ROBERT W. CORNELISON, a citizen of the United States, residing at Somerville, county of Somerset, State of New Jersey, have invented certain new and useful Improvements in Recording Instruments, of which the following is a specification.

This invention relates to improvements in recording instruments of the type embodying a chart and means for producing thereon a continuous record of certain conditions or operations, such as temperature, pressure, speed, or the like, depending upon the particular character of the instrument, which may be a recording thermometer, a recording gauge, a recording pyrometer, a recording speed indicator, or the like.

Recording instruments of this type are generally employed in connection with systems in which a constant or predetermined range of temperature, pressure, speed, or the like is to be maintained throughout a given interval of time, and the operator in charge, by observing the record upon the chart of the instrument, can readily ascertain if the condition of the system is being maintained at the desired point, and if it is not being thus maintained, the operator is immediately warned by the variations of the record upon the chart that it is necessary for him to take the proper steps to cause the temperature, pressure, speed or the like, to assume its normal operating value. In order that the system may be operated in a proper manner, the operator in charge should examine the record made by the instrument from time to time, at certain periodic intervals, as, for example, every hour that the system is in operation. In this way the operator may readily so maintain the system that the operation thereof will be uniform and constant, but if the operator, either through carelessness or forgetfulness, fails to give periodical attention to the record, an uneven and unsatisfactory operation of the system is liable to result.

In recording instruments as now constructed there is no provision for showing whether or not the operator in charge has performed his duty of periodically examining the record made thereby, in order to ascertain if the system is operating in a proper manner, and consequently the operator may shirk his duty, if he so desires, unless he is closely watched.

According to my invention, the recording instrument is provided with means adapted to be actuated by the operator, each time that he examines the record made by the instrument, for positively marking the chart in such a manner as to show that he performed his necessary duty and examined the record at the desired periodical intervals of time. The means for accomplishing this desirable result is simple in its construction and may be readily applied to recording instruments such as are now in use.

In the accompanying drawings, forming part of this application, wherein I have shown several preferred embodiments of my invention for the purpose of illustrating the principle thereof, Figure 1 is a front view of a recording instrument embodying my invention;

Figure 2 is an enlarged detail sectional view taken on the line II—II of Figure 1;

Figure 3 is a view similar to Figure 2 showing a modified construction of the means constituting the invention;

Figure 4 is a front view of a portion of a recording instrument with the cover glass removed, showing a further modification of the invention;

Figure 5 is an enlarged sectional view taken on the line V—V of Figure 4, and

Figure 6:
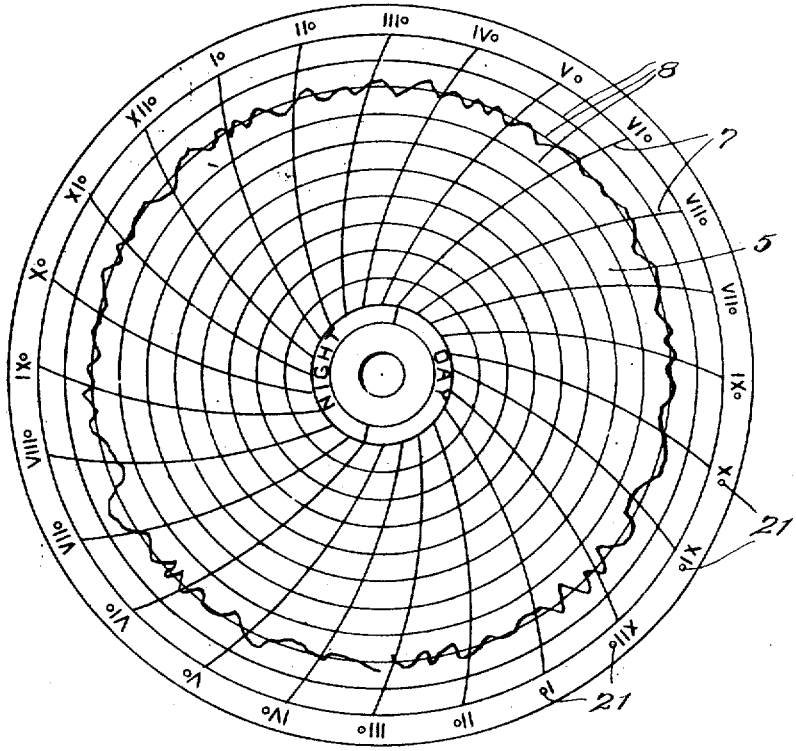
Figure 6 is a face view of a chart bearing a record of the marks made by the operator to show that he examined the same each hour.

Referring to Figures 1 and 2 of the drawings, the recording instrument is shown as comprising a casing 1, of any suitable shape and size, having a glass cover plate or window 2. The cover plate is normally locked or otherwise secured in its closed position whereby to prevent access to the interior of the casing. Supported within the casing upon an annular flange 3 is a rigid plate 4, which serves as a support for a chart 5, preferably formed of paper or the like, and adapted to be rotated uniformly in the usual manner by means of suitable mechanism positioned within the casing. As the mechanism for rotating the chart forms no part of the invention and may be of any approved type it is not deemed necessary to illustrate the same. Positioned within the casing, and coacting with the chart 5 to produce a record thereon in the usual manner, is a recording member 6, of any approved type, which is actuated by suitable means, not shown, responsive to variations in temperature, pressure or the like. As shown, the chart 5 is provided with twenty four, equi-spaced substantially radial lines 7, marked to indicate hours, and with a plurality of concentric lines 8 to indicate temperature, pressure, or the like, whereby the chart is adapted to show the temperature, pressure, or the like for a continuous period of twenty-four hours. The parts thus far described are old and well known in recording instruments, and it is of course understood that the form and arrangement thereof may be varied from the particular construction shown, which is merely illustrative of a recording instrument of a conventional type.

Supported upon the glass cover plate 2, and extending through a hole 9 formed therein adjacent its periphery, is a housing including a chambered portion 10 and a bushing 11, detachably secured to one another as by screw-threads 12 and having registering flanges 13 and 14, respectively, adapted to engage the inner and outer surfaces of the glass cover plate whereby the housing is securely held in position thereon. Reciprocatingly supported upon the housing is a push button 15 carrying a needle 16 the inner end of which extends through a guiding thimble 17. The push button 15 and needle 16 are normally maintained in raised or inoperative position by means of a spring 18 positioned within the housing. A collar 19 upon the push button 15 adjacent its lower end serves to limit the outward movement thereof. When the push button and needle are in their normal positions the lower end of the needle is spaced from the chart 5, as clearly shown in Figure 2, so as not to interfere with the rotary movement thereof, but upon applying pressure to the push button it will be depressed and the lower end of the needle will be caused to pass through the chart to mark the same by forming a perforation therethrough, the plate 4 being recessed, as indicated at 20, to permit the needle to pass freely through the chart. Upon relieving the pressure upon the push button, the spring 18 will return it and the needle to their normally inoperative positions.

In operation, each time the operator in charge observes the record made by the instrument he actuates the auxiliary chart marking means by pushing button 15 to cause the needle 16 to perforate the chart thus producing a mark thereon to indicate that he attended to his duties in a proper manner and at the proper periodic intervals. Assuming for example, that the operator is required to observe the record made by the instrument every hour, if he performs his duty the chart, when removed from the instrument at the end of the day, will be marked by a plurality of perforations 21, adjacent its outer edge, each mark being in register with one of the hour lines 7, as shown in Figure 5. As the casing is closed and locked, the operator is prevented from having access to the interior thereof, and consequently, he is unable to falsely mark the chart to indicate that he observed the instrument at a certain time if he actually failed to perform his duty at such time. A person examining the chart is thus advised of the fact that the operator in charge has attended to his duty by observing the record at the proper periodic intervals.

As shown in Figure 3 the housing 10, 11, is secured to the side wall of the casing 1 and extends through an opening formed therein. In this form of the device the push button 15 carries a flexible needle 22 which extends through a curved guiding thimble 23. When the push button is pressed inwardly the inner end of the needle will be caused to form a perforated mark in the chart as above described in connection with the form of device shown in Figure 2.

In Figures 4 and 5, I have shown a modified form of marking device by means of which, instead of perforating the chart, a mark is made upon the surface thereof. This form of device comprises a spring arm 24 positioned within the casing 1 and having one of its ends secured thereto as by screws 25. Secured to the free end of the arm, and extending downwardly with respect thereto, is a suitable holder 26 adapted to carry a lead point or the like 27 at its lower end. The free end of the spring arm normally rests upon a pin 28 carried by the casing and having its inner end curved downwardly as indicated at 29. A push button 30, extending through the casing, has its inner end connected to the arm 24 in any suitable manner, as by a pin 31, sufficient play being provided to permit the free end of the arm to move downwardly a slight distance when the push button is pressed inwardly. The spring arm is so formed that the free end thereof tends to move downwardly toward the chart, but it is normally maintained in its raised or inoperative position by its engagement with the pin 28, in which position the lead point 27 is out of engagement with the chart.

In operation, when pressure is applied to the push button 30 the spring arm 24 will be forced inwardly from its normal position and during its inward movement the free end thereof will ride down the curved inner end of the pin 28 thus permitting the lead point 27 to engage the chart 5 and make a mark thereon. As soon as the pressure upon the push button is relieved, the arm will be returned to its normally inoperative position.

While I have illustrated and described my invention in connection with certain preferred embodiments thereof, it will be understood that I do not intend to limit myself to the specific embodiments shown, but that I intend to cover my invention broadly, in whatever form its principles may be employed.

Having thus described my invention, I claim:—

1. In a recording instrument, a chart, automatic means for producing on said chart a continuous record of the variations of a variable factor, and manually operable means forming part of said instrument for making periodically an additional record on said chart.

2. In a recording instrument, a casing, a driven chart within said casing, automatic means for producing on said chart a continuous record of the variations of a variable factor, and manually operable means forming part of said instrument for making periodically an additional record on said chart.

3. In a recording instrument, a casing having a window, a driven chart visible through said window, automatic means for producing on said chart a continuous record of the variations of a variable factor, and manually operable means forming part of said instrument and operable from without said casing for making periodically an addition-record on said chart.

4. In a recording instrument, a casing having a window, a driven chart visible through said window, automatic means for producing on said chart a continuous record of the variations of a variable factor, auxiliary chart marking means arranged within said casing and normally out of engagement with said chart, and manually operable means without said casing for actuating said auxiliary chart marking means.

5. In a recording instrument, a casing, a glass cover plate therefor, a driven chart visible through said cover plate, automatic means for producing on said chart a continuous record of the variations of a variable factor, and manually operable means carried by said cover plate for making periodically an additional record on said chart.

6. In a recording instrument, a casing, a glass cover plate therefor, a driven chart visible through said cover plate, automatic means for producing on said chart a continuous record of the variations of a variable factor, a reciprocatable button carried by said cover plate and extending therethrough, and chart marking means normally out of engagement with said chart and adapted to be forced into engagement with said chart by the depressing of said button.

7. In a recording instrument, the combination of a chart, means for producing a continuous record thereon indicative of certain conditions to which the instrument is responsive, and chart-marking means adapted to be actuated by an observer of the instrument to produce a record thereon indicative of the number of observations taken by the observer during the production of the continuous record.

8. In a recording instrument, the combination of a uniformly movable chart provided with divisions indicative of successive uniform intervals of time, means for producing a continuous record upon the chart indicative of certain conditions to which the instrument is responsive, and chart marking means adapted to be actuated by an observer of the instrument to produce marks upon the chart at successive intervals of time, said marks serving in connection with the time divisions of the chart to show at what times the observer took observations of the continuous record.

9. In a recording instrument, a chart, markings thereon for indicating intervals of time, automatic means responsive to the variations of a factor for producing a record on said chart, and manually operable means for producing an additional record on said chart.

10. In combination, a chart, a record thereon showing the chronological variation of a variable factor, and a second record thereon showing the times when an attendant took notice of said variable factor.

11. The method herein described, which consists in providing on a chart showing the changes of a variable factor, a record showing the periods of time when an attendant took notice of said variable factor.

12. The method of recording the attendance of an operator to an instrument recording chronologically the variations of a factor, which consists in providing on a chart on which said variations are being recorded, a record of the times when said operator attended to said instrument.

13. In an instrument for recording the variation of a factor and the periodic observation of the record thus produced by a watchman, means for recording the variations of said factor, and means responsive to an act of the watchman for recording the time of actuation thereof.

14. In an instrument of the character described, means for recording the chronological variations of a variable factor, and means responsive to an act of an attendant for recording the time of actuation thereof by said attendant.

15. In a recording instrument, a normally closed casing, a chart therein, means for making a mark on said chart, means for producing relative movement between said chart and marking means so as to make on said chart a chronological record of the variations of a variable factor, and manually controlled means, operable without opening the casing so as to give access to said chart, for making a record on the chart showing the time of operation of said manually controlled means.

In testimony whereof I have affixed my signature to this specification.

ROBERT W. CORNELISON.